United States Patent [19]

Mack et al.

[11] Patent Number: 4,833,613
[45] Date of Patent: May 23, 1989

[54] METHOD FOR CONTROLLING AMT SYSTEM INCLUDING THROTTLE POSITION SENSOR SIGNAL FAULT DETECTION AND TOLERANCE

[75] Inventors: William J. Mack, Warren; William F. Cote, Farmington Hills, both of Mich.

[73] Assignee: Eaton Corporation, Cleveland, Ohio

[21] Appl. No.: 853,577

[22] Filed: Apr. 18, 1986

[51] Int. Cl.⁴ .............................................. G06F 15/00
[52] U.S. Cl. ......................... 364/424.05; 364/571.01; 74/866; 371/16
[58] Field of Search ............... 123/479, 339, 361, 399; 74/866, 335; 371/16, 4, 8; 364/571, 431.11, 424, 424.1, 426, 551; 192/129 A; 60/906; 73/118.1

[56] References Cited

U.S. PATENT DOCUMENTS

| | | | |
|---|---|---|---|
| 4,081,065 | 3/1978 | Smyth et al. | 192/0.076 |
| 4,337,516 | 6/1982 | Murphy et al. | 364/571 |
| 4,344,364 | 8/1982 | Nickels et al. | 364/442 |
| 4,490,804 | 12/1984 | Martinsons | 364/571 |
| 4,493,228 | 1/1985 | Vukovich et al. | 74/866 |
| 4,519,360 | 5/1985 | Murakami | 123/361 |
| 4,519,361 | 5/1985 | Murakami | 123/361 |
| 4,583,176 | 4/1986 | Yamato et al. | 123/479 |
| 4,593,357 | 6/1986 | Van Ostrand et al. | 364/551 |
| 4,612,615 | 9/1986 | Murakami | 123/361 |
| 4,615,321 | 10/1986 | Haefner et al. | 364/571 |
| 4,618,954 | 10/1986 | Octobe et al. | 371/16 |
| 4,627,253 | 12/1986 | Tennessen et al. | 192/129 A |
| 4,669,046 | 5/1987 | Kubo | 364/565 |
| 4,704,685 | 11/1987 | Martinsons et al. | 364/431.11 |
| 4,718,013 | 1/1988 | Kubo | 364/426 |

Primary Examiner—Parshotam S. Lall
Assistant Examiner—Ellis B. Ramirez
Attorney, Agent, or Firm—H. D. Gordon

[57] ABSTRACT

A method for controlling an AMT system (10) is provided including sensing and identifying faulty input signals (THD, THPS and RTDS) from the throttle position sensor assembly (22) sensors (22A, 22B and 22C). If only a known one of the input signals is faulty, logic method of control (38) is modified to a logic method tolerant of the identified faulty input signal.

8 Claims, 5 Drawing Sheets

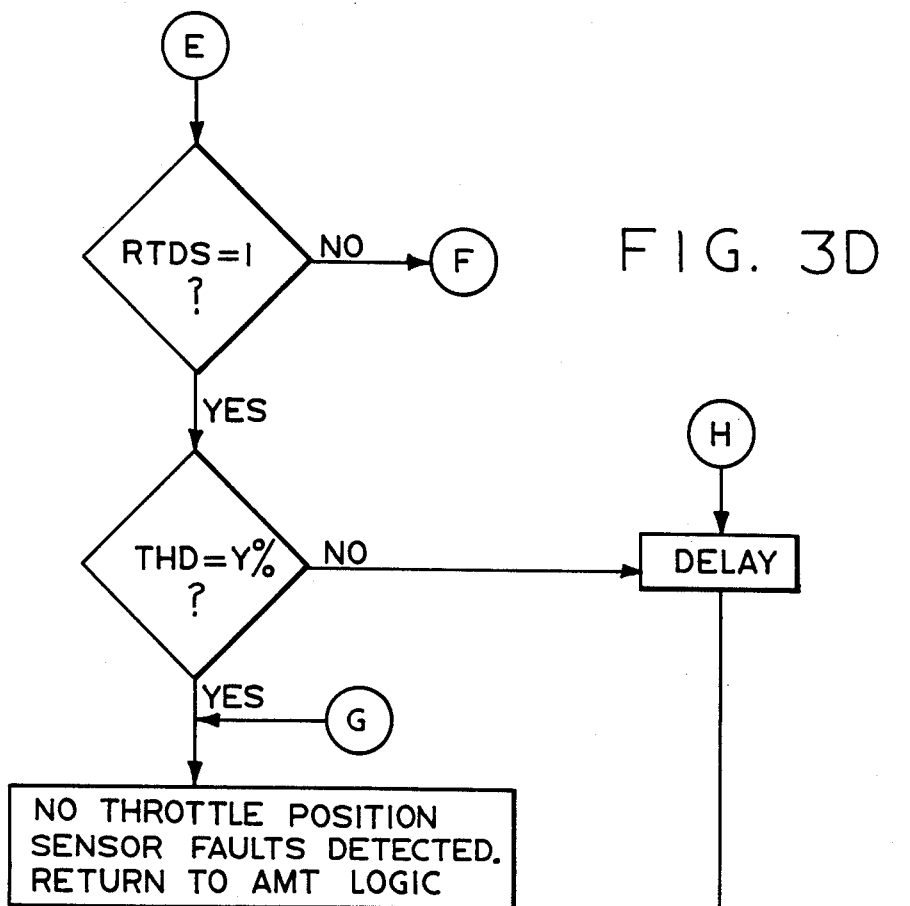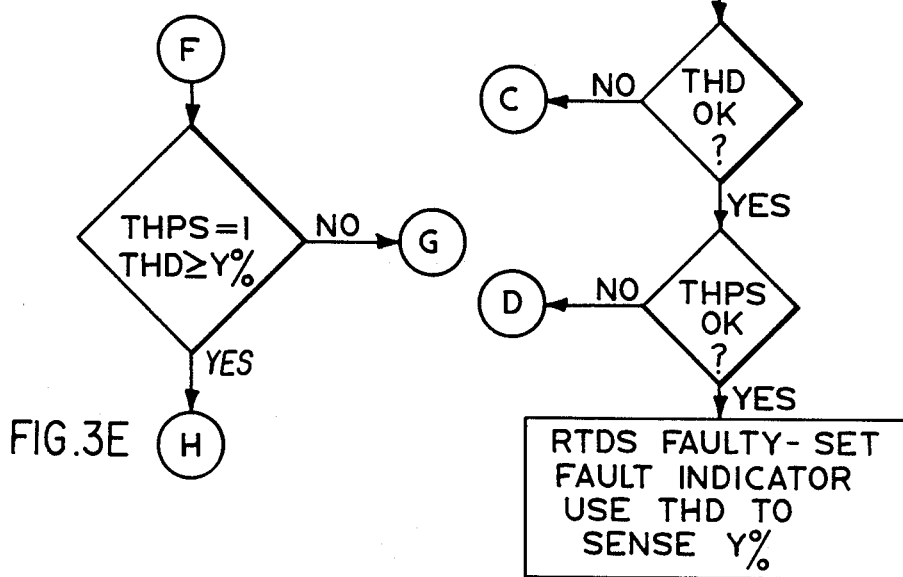
FIG. 3D
FIG. 3E

METHOD FOR CONTROLLING AMT SYSTEM INCLUDING THROTTLE POSITION SENSOR SIGNAL FAULT DETECTION AND TOLERANCE

BACKGROUND OF THE INVENTION

1. Field of the Invention

This invention relates to automatic power transmisions providing a plurality of gear reduction ratios, such as automatic mechanical transmissions (i.e. "AMTs"), and, to control systems and methods therefor. In particular, the present invention relates to control systems and methods for automatic mechanical transmission systems wherein gear selection and shift decisions are made and/or executed based upon measured and/or calculated parameters such as vehicle or transmission output shaft speed, transmission input shaft speed, engine speed, throttle position, rate of change of throttle position, rate of change of vehicle and/or engine speed and the like. More particularly, the present invention relates to a method for controlling an AMT system utilizing sensors for providing input signals indicative of throttle position, throttle position equal to or greater than at least a first minimum reference value ("idle") and throttle position equal to or greater than at least a second detented reference value ("kick-down"), including sensing of a faulty signal from one of such sensors, identifying the fault and modifying the system operation logic in tolerance of such identified fault.

2. Description of the Prior Art

The use of automatic transmissions of both the automatic mechanical type utilizing positive clutches and of the planetary gear type utilizing frictional clutches is well known in the prior art as are control systems therefor. Electronic control systems utilizing discrete logic circuits and/or software controlled microprocessors for automatic transmissions wherein gear selection and shift decisions are made based upon certain measured and/or calculated parameters such as vehicle speed (or transmission output shaft speed), transmission input shaft speed, engine speed, rate of change of vehicle speed, rate of change of engine speed, throttle position (usually expressed as a percentage of full throttle), rate of change of throttle position, full depression o f the throttle (i.e. "kickdown"), at least minimal depression (foot-on) of throttle actuation of the braking mechanism, currently engaged gear ratio, and the like are known in the prior art. Examples of such automatic and semi-automatic transmission control systems for vehicles may be seen by reference to U.S. Pat. Nos. 4,361,060; 4,551,802; 4,527,447; 4,425,620; 4,473,427; 4,081,065; 4,073,203; 4,253,348; 4,038,889; 4,226,295; 3,776,048, 4,208,929; 4,039,061; 3,974,720; 3,478,851 and 3,942,393, the disclosures of which are all hereby incorporated by reference.

While the above referenced automatic and semi-automatic transmission control systems, and similar systems, are effective to control an automatic transmission by selecting a desired gear ratio which will tend to optimize the fuel economy and/or performance of the vehicle in view of the sensed parameters/or commanding a shift into a selected gear ratio, such control systems were not totally acceptable as the predetermined programs utilized did not include logic routines, or methods, to recognize and identify a fault in the input signals from one of the throttle position sensors and/or could not modify the predetermined program to provide a tolerance to such a sensed fault.

Summary of the Invention

In accordance with the present invention, the drawbacks of the prior art have been overcome or minimized by providing a control system, preferably an electronic control system, and control method, for automatic and semi-automatic mechanical transmission systems wherein the supply of fuel to the vehicle engine, gear selection and/or shift decisions are made and/or executed based upon measured and/or calculated parameters including at least input signals indicative of throttle position, engine speed, transmission input shaft speed and transmission output shaft speed. Other inputs/parameters, such as signals indicative of rate of change of throttle position, condition of the master clutch, currently engaged gear ratio, operation of the vehicle brakes, and the like are also utilized to make decisions for control of the AMT system.

The predetermined logic rules or programs by which the various input signals are processed include a self-diagnostic routine or method for detecting a fault in the input signals from one or more of the throttle position sensors and a method for modifying the predetermined logic in response to a sensed fault in any one of the throttle position sensors to provide an acceptable, if less than optional, set of logic rules for continuing operation of the AMT system until such time as the fault ceases or is corrected.

A throttle position sensor input signal is considered to be faulty if the value thereof is not, within acceptable tolerance limits, indicative of the true condition of the throttle position parameter monitored by the relevant sensor.

The above is accomplished by establishing a set of relationships between various throttle position input signals, such as an idle position sensor signal, a ride through detent position sensor signal and a potentiometer position sensor signal, which, under defined conditions, must be true. If, under the defined conditions, these relationships are not true, a fault in the input signals from one or more of the sensors exists, and various relationships are evaluated to identify the one or more faulty sensors. If the diagnostic logic identifies a single known a sensor is in fault, the logic routines are modified to allow a continued system operation, in tolerance of such a sensed fault, until such time as the fault disappears (i.e. self-corrects) and/or is corrected.

Utilizing an alternate control method or algorithm structured specifically to a sensed non-standard condition, such as a sensed faulty input signal, in place of the control algorithm utilized in the absence of such non-standard conditions is, for purposes of describing this invention, referred to as a modification to the control algorithm or program by which the input signals are processed for issuing the command output signals by which the AMT is controlled.

Accordingly, it is an object of the present invention to provide a new and improved control method for automatic mechanical transmission systems which involves sensing and identifying a fault in the throttle position sensors and modifying the logic routines or algorithms by which the system is operated in tolerance of such sensed and identified fault.

This and other objects and advantages of the present invention will become apparent from a reading of the description of the preferred embodiment taken in connection with the attached drawings.

BRIEF DESCRIPTION OF THE DRAWINGS

FIGS. 3A-3D are symbolic illustrations, in the form of a flow chart, illustrating the preferred manner of practicing the method of the present invention.

DESCRIPTION OF THE PREFERRED EMBODIMENT

Figure 1:
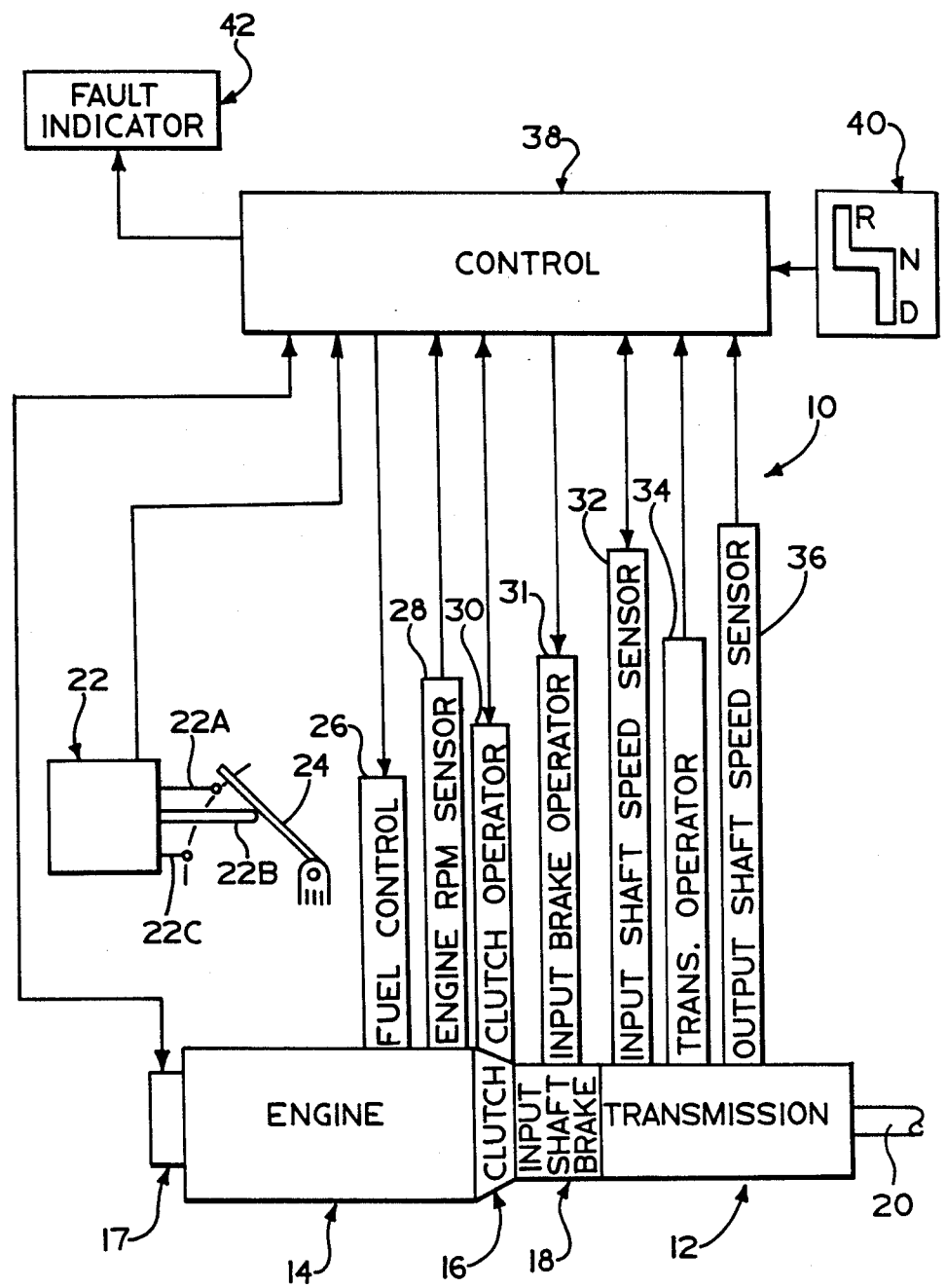
FIG. 1 is a schematic illustration of the components and interconnections of the automatic mechanical transmission control system of the present invention.
Figure 2:
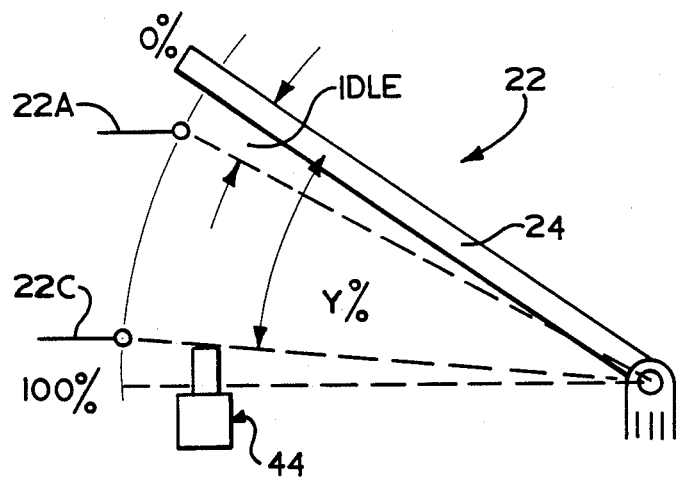
FIG. 2 is an enlarged schematic illustration of the throttle position sensor assembly of the present invention.
Figure 3A:
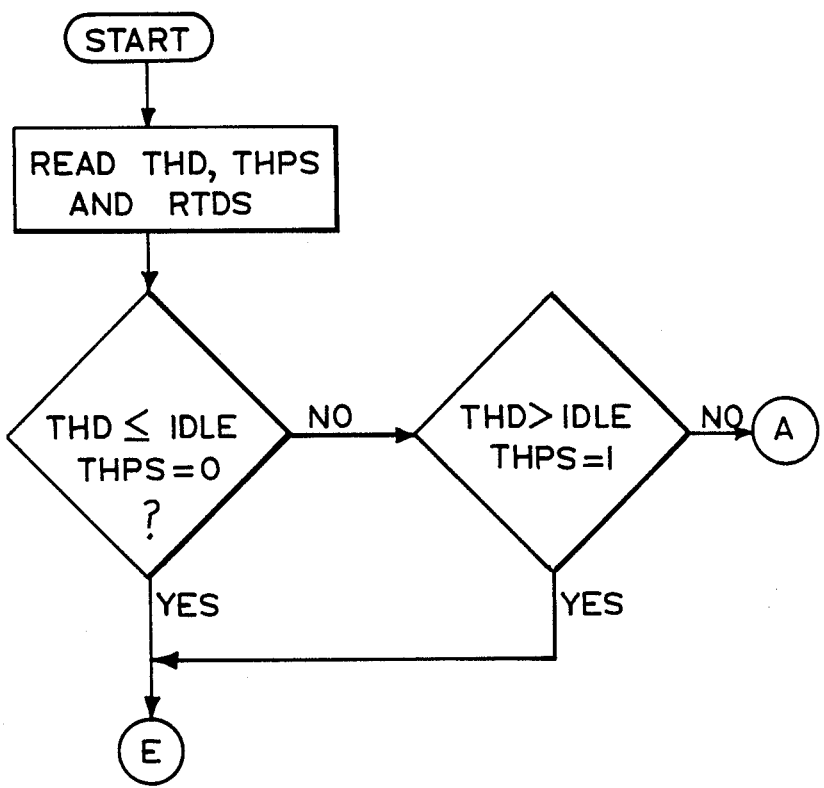
Figure 3B:
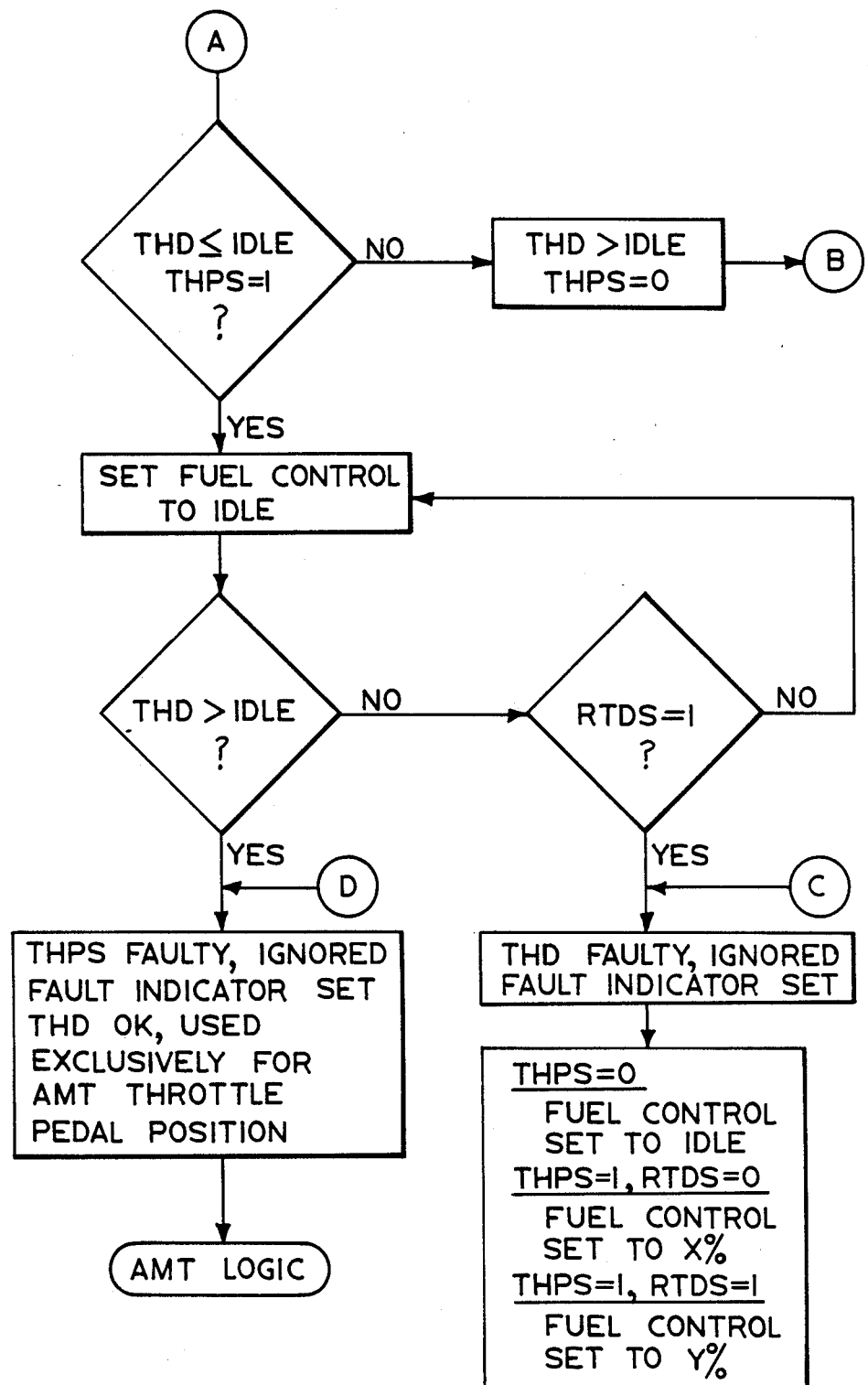
Figure 3C:
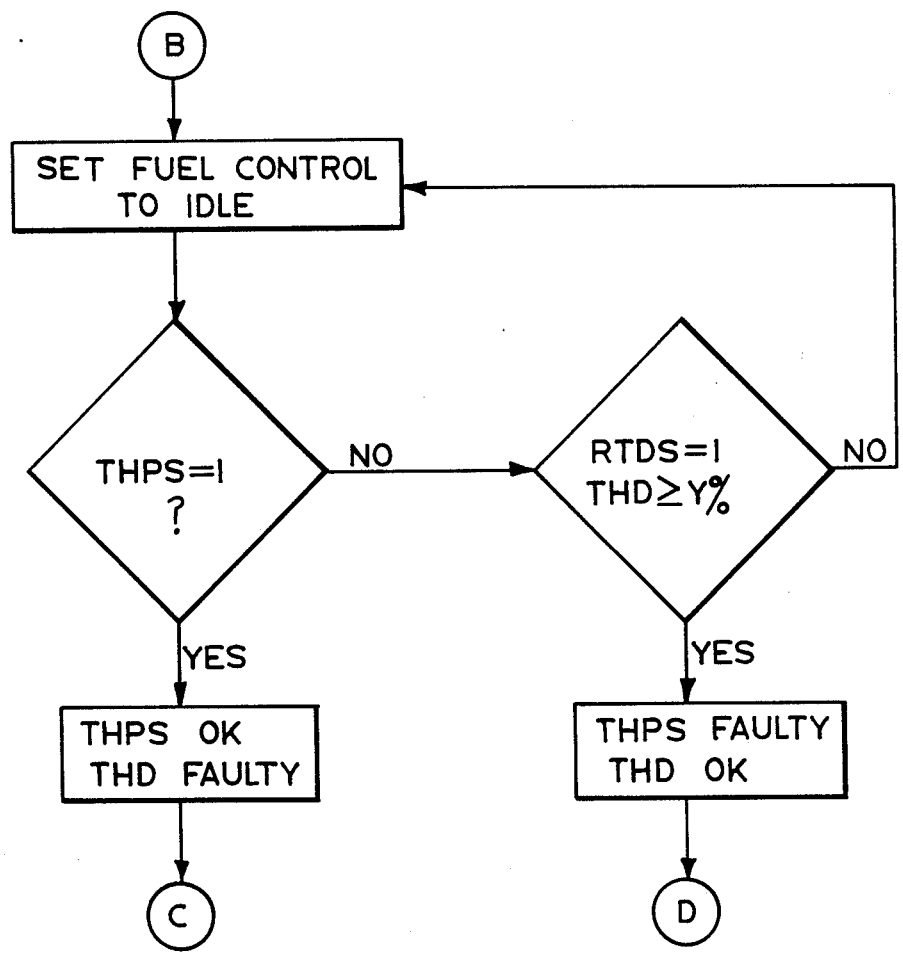

FIG. 1 schematically illustrates an automatic mechanical transmission system 10 including an automatic multi-speed compound change gear transmission 12 driven by a throttle controlled engine 14, such as a well known diesel engine, through a master clutch 16. An engine brake, such as an exhaust brake 17 for retarding the rotational speed of engine 14 and/or an input shaft brake 18 which is effective to apply a retarding force to the input shaft upon disengagement of master clutch 16 may be provided as is known in the prior art. The output of automatic transmsision 12 is output shaft 20 which is adopted for driving connection to an appropriate vehicle component such as the differential of a drive axle, a transfer case or the like as is well known in the prior art.

The above mentioned power train components are acted upon and monitored by several devices, each of which will be discussed in greater detail below. These devices include a throttle position or throttle opening monitor assembly 22 which senses the position of the operator controlled vehicle throttle or other fuel throttling device 24, a fuel control device 26 for controlling the amount of fuel to be supplied to engine 14, an engine speed sensor 28 which senses the rotational speed of the engine, a clutch operator 30 which engages and disengages clutch 16 and which also supplies information as to the status of the clutch, an input brake operator 31, a transmission input shaft speed sensor 32, a transmission operator 34 which is effective to shift the transmission 12 into a selected gear ratio and to provide a signal indicative of currently engaged ratio, and a transmission output shaft speed sensor 36. Alternatively, the engaged gear ratio of transmission 11 may be calculated by comparing the input shaft speed signal to the output shaft speed signal. A vehicle brake monitor (not shown) which senses actuation of a vehicle brake pedal may also be utilized.

The above mentioned devices supply information to and/or accept commands from a central processing unit or control 38. The central processing unit 38 may include analogue and/or digital electronic calculation and logic circuitry, the specific configuration and struture of which forms no part of the present invention. The central processing unit 38 also receives information from a shift control assembly 40 by which the vehicle operator may select a reverse (R), neutral (N), or forward drive (D) mode of operation of the vehicle. An electrical power source (not shown) and/or source of pressurized fluid (not shown) provides electrical and/or pneumatic power to the various sensing, operating and/or processing units. A fault indicator or alarm 42 may display the identity of a specific fault or simply signal the existence of an unidentified fault. Drive train components and controls therefor of the type described above are known in the prior art and may be appreciated in greater detail by reference to above mentioned U.S. Pat. Nos. 4,361,060; 3,776,048; 4,038,889 and 4,226,295.

Sensors 22, 28, 32, 36, and 40 may be of any known type of construction for generating analogue or digital signals proportional to the parameter monitored thereby. Similarly, operators 17, 18, 26, 30 and 34 may be of any known electrical, pneumatic or electropneumatic type for executing operations in response to command signals from processing unit 38. Fuel control 26 will supply fuel to engine 14 in accordance with command output signals from controller 38 which will normally command fuel supply in accordance with the operator's setting of throttle 24 but may command the fuel control to supply a lesser (fuel dip) or greater (fuel boast) amount of fuel as required for synchronizing the transmission 12 and/or smoothly engaging the clutch 16.

The purpose of the central processing unit 38 is to select, in accordance with a program (i.e. predetermined logic rules) and current or stored parameters, the optimal gear ratio at which the transmission should be operating and, if necessary, to command a gear change, or shift, into the selected optimal gear ratio based upon the current and/or stored information.

The present invention is also applicable to those AMT systems wherein the control unit 38 automatically performs a gear change operation manually selected by the vehicle operator.

The various functions to be performed by central processing unit 38, and a preferred manner of performing same may be seen in greater detail by reference to allowed pending U.S. patent application Ser. No. 659,114 filed Oct. 10, 1984, now U.S. Pat. No. 4,595,986, and to published Society of Automotive Engineers SAE Paper No. 831776 published November 1983, the disclosures of which are hereby incorporated by reference.

Devices, such as throttle position sensor assembly 22, for sensing the operators setting of a throttle pedal 24, or the like, and providing a signal proportional to, or at least indicative of, the monitored setting, and so called "remote fuel control" or "fly by wire" systems utilizing same, are known in the prior art and illustrated in the U.S. Pat. Nos. 4,240,845; 4,305,359; 4,319,658 and 4,461,254, the disclosures of which are hereby incorporated by reference.

For control of vehicle AMT systems 10, such as the systems illustrated in above-mentioned U.S. Pat. Nos. 4,551,802; 4,361,060 and 4,081,065, it is important to provide accurate input signals to central processing unit, or control, 38, indicative of the operator's positioning of the throttle. The setting is usually expressed as a percentage of wide-open or full throttle with the idle position being zero percent (0%) and full or maximum throttle being one hundred percent (100%). This is the parameter monitored by plunger 22B of sensor assembly 22 and provides what will be referred to as the "throttle demand potentiometer" or "THD" input signal to control 38.

To provide more responsive control of AMT System 10, and/or to provide at least partial redundance in the throttle position sensor assembly 22, two additional sensors, the "throttle pedal safety switch" 22A and the "ride through detent switch" 22C are provided.

Switches 22A and 22C, respectively provide the "THPS" and "RTDS" input signals, respectively, to control unit 38.

The throttle pedal safety switch, 22A, provides a signal "THPS" which is indicative of the driver's foot on the throttle pedal and greater than engine idle speed fuel required. The ride through detent switch, 22C, provides an input signal "RTDS" indicative of a desire for maximum performance. This is often referred to as a "kick-down" signal.

Throttle control is the, or one of the, most safety critical of the AMT functions. Accordingly, it is desirable to include mechanisms to provide assurance that any system failure will result in safe throttle operation. The primary goal is to insure that if the driver removes his foot from the throttle pedal 24 it is sensed by the AMT system and a return to idle command is issued to the throttle actuator 26. It is very desirable that the throttle position sensor assembly or subsystem 22 be as failsafe as possible and very desirable that it possess some level of fault tolerance as well.

Throttle position sensor assembly 22 "failsafe" and fault tolerance is accomplished by making use of the partial redundance that is built into the device. In addition to the potentiometer or functionally similar device 22B that provides the primary source of information on the throttle pedal position, i.e. the THD signal, there are two switches that can be utilized for safety checks and limp home capability. The first of these switches 22A closes when the sensor has moved approximately five percent (5%) of it's total travel off of the idle stop. The other switch 22C closes at approximately ninety-five percent (95%) percent of the full scale travel and occurs after passing a physical detent 44 in the mechanism. These switches, as indicated above, are referred to as the throttle pedal safety switch (THPS) and the ride through detent switch (RTDS) respectively.

The present invention provides a control method for sensing a failure in one or more of the sensors 22A, 22B or 22C of throttle position sensor assembly 22 and provides a fault tolerant, or "limp home", mode of operation for AMT system 10 in view of a sensed fault. As stated above, as throttle control is among the most safety critical of all the AMT functions, it is necessary to provide assurance that any system failure will result in safe throttle operation and to insure that if the driver removes his foot from the throttle pedal 24 it is sensed by the AMT system control 38 and a return to idle command is issued to the throttle actuator 26.

Accordingly, the following method is utilized to determine if the throttle pedal 22 has been depressed.

Periodically, preferably at least once during each period of time in which the various mechanical actuators can react to a command output signal, the logic or control method utilized in processing unit 38 will attempt to verify the nonfaulty operation of the sensors 22A, 22B and 22C, and, if a fault is detected, identify the faulty sensor and, if possible, modify the control logic in a manner tolerant to such a sensed fault.

Assuming central processing unit 38 is a microprocessor based control unit, a complete cycle of processing current and stored parameters and issuing command output signals can be accomplished in less than 15-20 milliseconds while a typical actuator, such a solenoid controlled valve or the like, will require a minimum of 20-30 milliseconds to cause even initial movements of an operator such as clutch operator 30.

The first check that is made is to determine if the throttle demand potentiometer 22B and the throttle position safety switch 22A are sending consistent information (i.e. "THD" and "THPS" signals) to the processor. There are four possible states that can be generated by these two input devices, namely:
. Both THD and THPS indicate pedal 22 is at idle,
. Both THD and THPS indicate pedal 22 is not at idle,
. THD indicates idle but THPS indicates not at idle, or
. THD indicates not at idle but THPS indicates idle.

The interpretation and handling of each of these conditions is discussed separately below.

When both the THD signal from the potentiometer 22B and the THPS signal from switch 22A are indicating that the throttle pedal 24 is at the idle position, then it is assumed to be correct and no apparent THD or THPS fault is detectable.

When both the THD signal from the potentiometer and the THPS signal from switch 22A are indicating that the throttle pedal 24 is not at the idle position. Then it is assumed to be correct and no apparent THD or THPS fault is detectable.

When THD signal from sensor 22B indicates that the throttle pedal 24 is not being depressed by the driver and THPS signal from switch 22A indicates that it is, then an apparent fault exists. The problem at this point is that this condition can be caused by more than one class of faults and the correct interpretation cannot be made until more information becomes available. The two likely interpretations are that the driver actually does have his foot off of the pedal and the throttle pedal safety switch 22A has shorted, or that the has his foot on the pedal and the potentiometer has an open circuit going to it's positive voltage supply. Obviously, these are two totally contradictory interpretations and a decision must be made as to which is correct.

Since "failsafe" operation is the highest priority in the throttle system, we must initially interpret the correct data as the driver has his foot off of the pedal. This interpretation is maintained until further information is received allowing us to make a more educated decision.

If the driver does in fact have his foot off of the throttle pedal, then at some point in time the will go to apply the throttle. This will cause the THD signal to now indicate greater than idle throttle demand and allow the decision that the throttle pedal safety switch 22A has failed and the throttle potentiometer 22B is operating properly. A fault condition is flagged in logic, fault indicator 42 is activated and henceforth until the condition is repaired, throttle pedal safety switch 22A will be ignored and THD signal will be used exclusively to indicate throttle position.

On the other hand if the driver does in fact have his foot on the throttle pedal and the system holds the engine at idle, his natural reaction will be to press down harder on the pedal. As soon as the ride through detent switch 22C (RTDS) closes we have a confirming piece of information that the throttle pedal 24 is being depressed and the throttle potentiometer 22B has failed. In this case we cannot provide smooth throttle control since the primary position indicator has failed. Therefore, in order to provide some level of limp home capability the following scheme is used.

If the THPS signal is true (present) and RTDS signal is false (absent) then throttle fuel control 26 is set at an intermediate X% (i.e. 100%) throttle. If THPS is true and RTDS is also true then fuel control 26 is set at a maximum or near maximum Y% (i.e. 100%) throttle. If neither switch is closed fuel control 26 is set at idle. The THD signal being sent from the potentiometer 22B is ignored until repairs are made to the vehicle.

When the THD signal from sensor 22B indicates that the throttle pedal 24 is not at idle but the THPS signal from sensor 22A indicates that the throttle pedal is not depressed, this is a fault state of the throttle pedal sensor circuits. This is also an ambiguous state that cannot be accurately interpreted without further information. Once again the safe interpretation i.e., throttle pedal 24 at idle, is used until further data is received.

In this case if the driver does not have his foot on the pedal, at some future time he will depress the pedal and thus cause the THPS switch to make contact. This will provide confirmation that the THD potentiometer has failed. Since the potentiometer is the primary throttle pedal position sensing device, smooth and accurate control of the throttle cannot be maintained. In order to provide a limp home capability the above-mentioned scheme is used. If the THPS signal is true and RTDS is false then fuel is set at an intermediate setting X%, such as 30% throttle. If THPS is true and RTDS is also true then THL is set at a percent indicative of kickdown, such as Y% equaling 100% throttle. if neither switch is closed fuel is supplied at idle. The THD signal being sent from the potentiometer 22B is ignored and fault indicator 42 is activated until repairs are made to the vehicle.

If the driver actually does have his foot on the pedal and is requesting throttle and the system is holding the throttle at idle, his natural reaction is to press down harder on the pedal until something happens. The throttle will continue to be held at idle until the ride through detent switch 22C (RTDS) closes. At this point we have confirming information that the throttle pedal is being depressed if the THD potentiometer 22B is also indicating 100% throttle demand and can conclude that the THPS switch 22A has failed. The throttle will be controlled normally using the THD signal alone. As in all of the fault modes a fault flag is set and an indication of trouble is given to the driver.

Typically, closure of the ride through detent switch 22C, i.e. of RTDS signal true (equals one), causes three things to occur in the AMT system 10. First it allows the driver to override the road speed governor, it causes a lowering of the shift points to provide for maximum power, and it makes minor changes in the synchronization logic to allow for slightly faster shifts.

Since the ride through detent switch 22C (RTDS) is essential for proper identification of faults of the potentiometer 22B or the throttle pedal safety switch 22A, it is important that we detect and identify fauts in RTDS so that they can be corrected before a fault occurs in either of the other two devices.

The fault detection for the RTDS switch 22C is divided into two routines. If the switch 22 is closed (i.e. RTDS=1) it is checked for a short circuit. If it is open (i.e. RTDS=0) it is checked for an open circuit. Each of these test methods are described separately below.

The test for an incorrect RTDS true signal is called only when RTDS true (i.e. RTDS=1). If THPS is equal to one and THD exceeds the calculated point where RTDS should be true then it is correct for RTDS to be true and no fault check can be made. On the other hand, if one of the above two conditions is not true then the possibility exists that the ride through detent switch has shorted. Since it is also possible that a fault exists in either the THPS or the THD signals a time delay is implemented in this routine to insure that a fault in one of the other circuits will be detected and flagged before an erroneous identification of the fault is assigned to the RTDS signal. If the timer manages to expire and a fault has not been flagged for neither THPS nor THD and the erroneous condition still exists, then the ride through detent is then controlled strictly by calculating the point from the THD value.

The test for an improper false RTDS signal is called only when RTDS is false (i.e. equals zero). If THPS is true and the THD value exceeds the point where RTDS should be true, then it is possible that RTDS has failed. A time delay is initiated to insure that fault detection for RTDS lags the faults detection for the THPS switch 22A and the THD sensor 22B. If the time delay expires and a fault has not been detected in neither the THPS circuit nor the THD circuit then the RTDS is declared faulty and is ignored. RTD is then calculated strictly from the THD signal.

Although the AMT system 10 has been described as utilizing a microprocessor based control 38 and the methods and operations carried out as software modes or algorithms, it is clear that the operations can also be carried out in electronic/fluidic logic circuits comprising discrete hardware components.

Clutch operator 30 is preferably controlled by the central processing unit 42 and may engage and disengage master clutch 16 as described in above-mentioned U.S. Pat. No. 4,081,065. Transmission 12 may include synchronizing means, such as an accelerator and/or a brake mechanism as described in U.S. Pat. No. 3,478,851, hereby incorporated by reference. The transmission 12 is preferable, but not necessarily, of the twin countershaft type as is seen in U.S. Pat. No. 3,105,395, hereby incorporated by reference.

Although the present invention has been set forth with a certain degree of particularity, it is understood the various modifications are possible without departing from the spirit and scope of the invention as hereinafter claimed.

We claim:

1. A self-diagnostic method for controlling an automatic transmission system for devices having an operator controlled throttle device, throttle-controlled engine, a transmission having a plurality of gear ratio combinations selectively engagable between a transmission input shaft and a transmission output shaft, said automatic transmission system comprising an information processing unit having means for receiving a plurality of input signals indicative of the operator's setting of said throttle device, said input signals including (1) a first throttle position signal having a magnitude indicative of the operator's setting of said throttle device; (2) a second throttle safety switch signal providing a signal indicative of the operator moving said throttle device to a position at least slightly greater than the engine idle throttle device position; and (3) a third kickdown switch signal providing a signal indicative of the operator moving said throttle device to at least a substantially maximum throttle position, said processing unit including means for processing said input signals in accordance with a program for generating output signals whereby said transmission system is operated in accordance with said program, and means associated with said transmission system effective to actuate said transmission system in response to said output signals from said processing unit, the self-diagnostic method characterized by:

sensing the presence or absence of faulty first, second and third input signals indicative of the operator's setting of said throttle device;

upon sensing the presence of a faulty input signal indicative of operator's setting of said throttle device until determination that only a known one of said first, second and third input signals as faulty, setting the engine throttle control to its engine idle speed position; and if only a known one of said first, second and third input signals indicative of operator setting of said throttle device is determined to be faulty, modifying said program by ignoring said input signal determined to be faulty and utilizing predetermined logic rules for processing the other of said first, second and third input signals to determine an acceptable value for the operator's setting of said throttling device;

the presence of a faulty first, second and third input signal indicative oft the operator's setting of the throttle device sensed if one of the following relationships is false:

(a) $THD_C$ is less than or equal to $THD_I$, and THPS equals 0

(b) $THD_C$ is greater than $THD_I$, and THPS equals 1

(c) $THD_C$ is greater than or equal to $THD_K$, and RTDS equals 1

(d) $THD_I$ is less than or equal to $THD_C$ is less than $THD_K$, and RTDS equals 0, and THPS equals 1 where:

$THD_C$ = the current value of the first input signal, $THD_I$ = the value of the first input signal at engine idle position, $THD_K$ = the value of the first input signal at kickdown position, THPS = said second input signal having the value of 0 if the throttle device is set at less than an idle reference value and a value of 1 if the throttle device is set at a value equal to or greater than said idle reference value, and RTDS = said third input signal having the value of 0 if the throttle device is set to less than said kickdown position and a value of 1 if the throttle device setting is equal to or greater than said kickdown position.

2. The method of claim 1 wherein if RTDS=1 while $THD_C$ is less than $THD_K$ or if RTDS=0 while $THD_C$ is greater than or equal to $THD_K$ and THPS equals 1, and continues for a period of time without a first or second input signal fault detected, the third input signal is considered faulty and is ignored, a fault indicator is set and $THD_C$ only is utilized to sense RTDS throttle position.

3. The method of claim 1 wherein if:

$THD_C$ is less than or equal to $THD_I$, and THPS equals 1 the throttle control is set to engine idle fuel supply and thereafter;

if $THD_C$ is greater than $THD_I$, the second input signal is considered faulty and is ignored, $THD_C$ is considered correct and is utilized for all throttle device position input values and a fault indicator is set; and if RTDS=1 while $THD_C$ is less than or equal to $THD_I$, the first input signal is considered faulty and is ignored and a fault indicator is set.

4. The method of claim 3 wherein, if the first input signal is considered faulty, the program is modified by:

if THPS=0, fuel is supplied at idle value;

if THPS=1 and RTDS=0, fuel is supplied at an intermediate value; and if THPS=1 and RTDS=1, fuel is supplied at a a relatively high value.

5. The method of claim 4 wherein said intermediate value is about thirty percent of full throttle and said relatively high value is about one hundred percent of full throttle.

6. The method of claim 1 wherein if $THD_C$ is greater than $THD_I$, and THPS=0 the throttle control is set to engine idle fuel supply and thereafter;

if THPS=1 while $THD_C$ is greater than $THD_I$ the first input signal is considered faulty and is ignored and a fault indicator is set, and if RTDS=1 while THPS=0 and $THD_C$ is equal to or greater than $THD_K$, then THPS is considered faulty and is ignored, a fault indicator is set, and the first input signal is utilized for all throttle device position sensing.

7. The method of claim 6 wherein if the first input signal is considered faulty, and if:

THPS=0, fuel is supplied at idle value,

THPS=1 and RTDS=0, fuel is supplied at an intermediate value, and

THPS=1 and RTDS=1, fuel is supplied at a a relatively high value.

8. The method of claim 7 wherein said intermediate value is about thirty percent of full throttle and said relatively high value is about one hundred percent of full throttle.

* * * * *